UNITED STATES PATENT OFFICE.

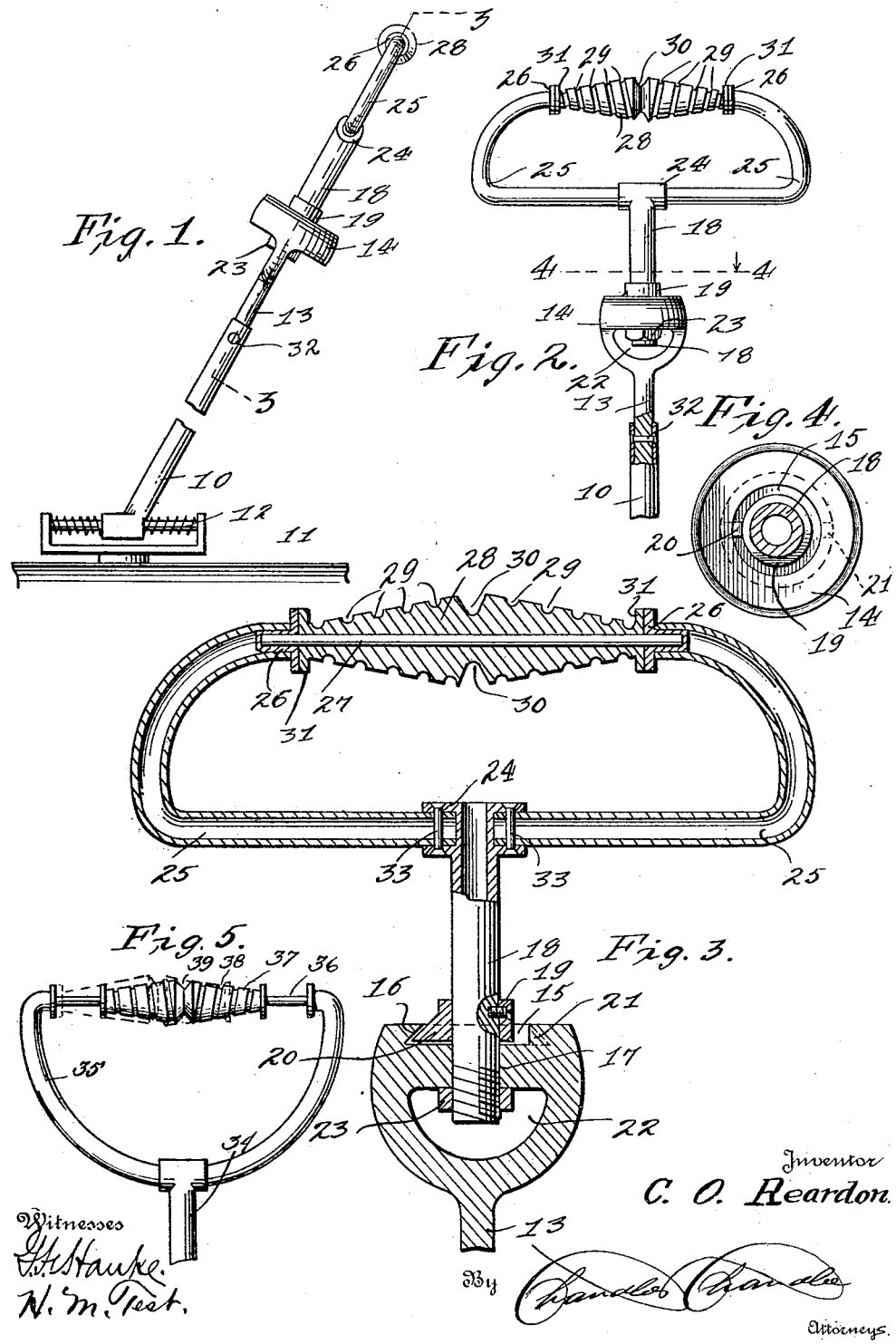

CHARLES O. REARDON, OF OAKLAND, CALIFORNIA.

TROLLEY.

1,198,659.      Specification of Letters Patent.      Patented Sept. 19, 1916.

Application filed November 22, 1915. Serial No. 62,816.

*To all whom it may concern:*

Be it known that I, CHARLES O. REARDON, a citizen of the United States, residing at Oakland, in the county of Alameda, State of California, have invented certain new and useful Improvements in Trolleys; and I do hereby declare the following to be a full, clear, and exact description of the invention, such as will enable others skilled in the art to which it appertains to make and use the same.

This invention relates to improvements in trolleys.

One object is to provide a trolley which will facilitate the finding and placing of the trolley wire thereagainst.

Another object is to provide a construction in a device of this character whereby the trolley will more readily follow the curve of the trolley wire, and which will not be so liable to jump from the wire.

Other objects and advantages will be apparent from the following description when taken in connection with the accompanying drawing.

In the drawing:—Figure 1 is a side elevation of a trolley made in accordance with my invention; Fig. 2 is a front elevation; Fig. 3 is an enlarged vertical sectional view on the line 3—3 of Fig. 1; Fig. 4 is a horizontal sectional view on the line 4—4 of Fig. 2; and Fig. 5 is an elevation of a modified form of harp and wheel.

Referring particularly to the accompanying drawing, 10 represents the ordinary trolley pole, which is mounted on the roof of the car 11 by means of the spring swivel mounting 12. Received in the upper end of the pole is the stem 13 of an enlarged member 14. In the upper portion of this member 14 is formed a circular recess 15, the surrounding walls of which are undercut, as shown at 16. In the center of the bottom of the recess there is formed a vertical opening 17 through which extends the stem 18 of the harp which will be more fully described later. Secured on the stem 18, is a sleeve 19, provided with the inclined lug 20, which engages under the undercut walls of the recess to permit rotation of said stem. A stop lug 21 is formed on the side wall of the recess to permit of a limited movement of the stem 18. The lower end of the stem 18 extends into a transverse opening 22 in the enlarged member and is threaded to receive a nut 23.

On the upper end of the stem 18 is secured a transverse head 24, which receives in its opposite ends the ends of certain of the arms of a pair of U-shaped members forming part of the before-mentioned harp, as clearly shown at 25. The terminals of the other arms of the U-shaped members are provided with socketed members 26 in which are journaled the ends of the axle or shaft 27. On this axle is mounted the double cone-shaped trolley wheel 28, said wheel being largest at the center and tapering toward the opposite ends. Formed in the face of the wheel, and extending toward the smaller ends thereof, are the spiral grooves 29 which are adapted to receive and guide the trolley wire toward the center of the wheel and into the main groove 30 formed in the center of the wheel. At the ends of the wheel are formed the flanges 31 which act as stops to prevent the wire from going entirely off the wheel and for the purpose of retaining the wire in engagement with the wheel when the trolley is being placed back on the wire.

It will be noted that the stem 13 is secured to the pole by passing a bolt or rivet 32 through both parts, and that the arms of the U-shaped members are secured in the ends of the head 24 by transverse bolts or rivets 33.

Referring to Fig. 5, there is shown a trolley pole 34, on the upper end of which is mounted the harp 35, said harp being similar to the harp 25, except that the arms are curved. In the arms of the harp there is secured a stationary shaft 36, on which is rotatably mounted the combined trolley wheel and finder 37. The shaft is somewhat longer than the wheel, whereby said wheel can move from one end of the shaft to the other. This is especially useful when rounding curves, as the wheel can move along the shaft, thus reducing the danger of disengagement from the trolley wire. The wheel is provided with the spiral grooves 38 and the central channel 39, in the same manner as the wheel of the other form.

What is claimed is:

An attachment for a trolley pole comprising a stem having an enlarged member on the upper end thereof, said enlarged member having a circular recess in the upper face thereof the surrounding wall of which is undercut, a stop lug formed on the wall and projecting into the recess, a rotatable harp stem disposed vertically through the enlarged member and rotatable therein, and an adjustable sleeve carried by the stem of the harp within the recess and provided with a lateral projection movable under the undercut wall and adapted to engage with the said stop lug to limit the rotary movement of the stem of the harp within the enlarged member.

In testimony whereof, I affix my signature, in the presence of two witnesses.

CHARLES O. REARDON.

Witnesses:
MICHAEL JOSEPH BARRETT,
DENNIS VAUGHAN.

Copies of this patent may be obtained for five cents each, by addressing the "Commissioner of Patents, Washington, D. C."